United States Patent
Park et al.

(10) Patent No.: US 10,549,623 B1
(45) Date of Patent: Feb. 4, 2020

(54) POWER TRANSMISSION APPARATUS FOR A VEHICLE

(71) Applicants: HYUNDAI MOTOR COMPANY, Seoul (KR); KIA MOTORS CORPORATION, Seoul (KR)

(72) Inventors: Juhyeon Park, Suwon-si (KR); Seongwook Ji, Gunpo-si (KR); Ki Tae Kim, Incheon (KR); Hye Jin Lim, Seoul (KR); Hyun Sik Kwon, Seoul (KR); Ilhan Yoo, Jeollanam-do (KR); Seong Wook Hwang, Gunpo-si (KR); Wonmin Cho, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/154,072

(22) Filed: Oct. 8, 2018

(30) Foreign Application Priority Data

Aug. 7, 2018 (KR) .......................... 10-2018-0091540

(51) Int. Cl.
*B60K 6/48* (2007.10)
*B60K 6/36* (2007.10)
(Continued)

(52) U.S. Cl.
CPC .............. *B60K 6/36* (2013.01); *B60K 6/387* (2013.01); *B60K 6/485* (2013.01); *B60K 6/547* (2013.01); *F16H 37/065* (2013.01); *B60K 2006/4808* (2013.01); *B60K 2006/4816* (2013.01); *B60K 2006/4825* (2013.01); *B60K 2006/4841* (2013.01); *F16H 2003/007* (2013.01)

(58) Field of Classification Search
CPC .......... B60K 6/36; B60K 6/387; B60K 6/485; B60K 2006/4808; B60K 2006/4816; B60K 2006/4825; F16H 37/065
See application file for complete search history.

(56) References Cited

U.S. PATENT DOCUMENTS

| 7,575,529 B2 * | 8/2009 | Holmes ................. B60K 6/365 475/5 |
| 8,323,142 B2 | 12/2012 | Masumoto |

(Continued)

FOREIGN PATENT DOCUMENTS

EP     3121483 A1     1/2017

*Primary Examiner* — Brian L Swenson
(74) *Attorney, Agent, or Firm* — Brinks Gilson & Lione

(57) ABSTRACT

A power transmission apparatus for a vehicle having an engine and a motor/generator includes first to third input shafts each selectively connected with a motor shaft. A power mediating shaft is coaxially disposed with the first input shaft, and first and second intermediate shafts each are disposed in parallel with the first input shaft. The second intermediate shaft is selectively connected with a transmission housing, and an idle shaft is disposed in parallel with the first input shaft. A first shifting section includes six gear sets disposed on the above shafts and outputs a plurality of intermediate shift-stages shifted from torques received through the first and third input shafts. A second shifting section forms an output torque by combination of torques from the first shifting section and the second input shaft, and an output shaft outputs a torque received from the first and second shifting sections.

10 Claims, 2 Drawing Sheets

Figure 1:
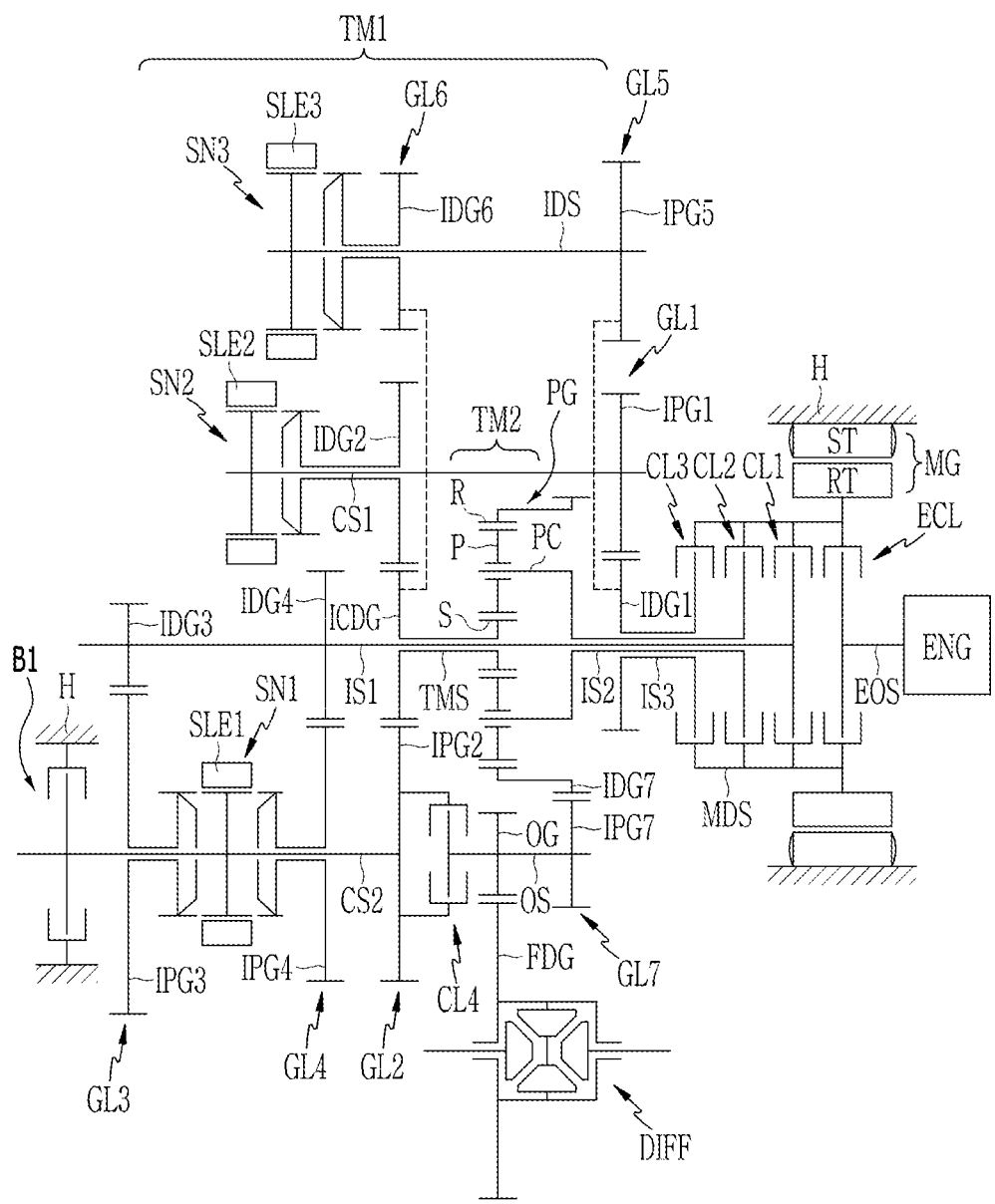

(51) Int. Cl.
  *B60K 6/387*   (2007.10)
  *B60K 6/547*   (2007.10)
  *B60K 6/485*   (2007.10)
  *F16H 37/06*   (2006.01)
  *F16H 3/00*    (2006.01)

(56) References Cited

U.S. PATENT DOCUMENTS

| | | | |
|---|---|---|---|
| 9,168,918 B2* | 10/2015 | Lee | B60W 20/30 |
| 10,451,152 B2* | 10/2019 | Hwang | F16H 37/046 |
| 2013/0031990 A1 | 2/2013 | Singh et al. | |
| 2015/0184731 A1* | 7/2015 | Lee | F16H 37/046 |
| | | | 475/5 |
| 2017/0023104 A1* | 1/2017 | Gwon | F16H 3/006 |
| 2018/0112743 A1* | 4/2018 | Lee | F16H 3/006 |

\* cited by examiner

FIG. 2

| | Shift-stage | ECL | CL1 | CL2 | CL3 | CL4 | B1 | SN1 | | | SN2 | | SN3 | |
|---|---|---|---|---|---|---|---|---|---|---|---|---|---|---|
| | | | | | | | | IPG3 | N | IPG4 | IDG2 | N | IDG6 | N |
| Engine and Parallel mode | REV | ● | | | ● | ● | | | ● | | ○ | ● | ● | |
| | FD1 | ● | ● | | | ● | | ● | | | ○ | ● | ○ | ● |
| | FD2 | ● | | | ● | ● | | ○ | ● | ○ | ● | | ○ | ● |
| | FD3 | ● | ● | | | ● | | | | ● | ○ | ● | ○ | ● |
| | FD4 | ● | | ● | | ● | | ○ | ● | ○ | ○ | ● | ○ | ● |
| | FD5 | ● | ● | ● | | | | | | ● | ○ | ● | ○ | ● |
| | FD6 | ● | | ● | ● | | | ○ | ● | ○ | ● | | ○ | ● |
| | FD7 | ● | ● | ● | | | | ● | | | ○ | ● | ○ | ● |
| | FD8 | ● | | ● | | | ● | ○ | ● | ○ | ○ | ● | ○ | ● |
| | FD9 | ● | | ● | ● | | | | ● | | ○ | ● | ● | |
| EV mode | REV | | | | ● | ● | | | ● | | ○ | ● | ● | |
| | FD1 | | ● | | | ● | | ● | | | ○ | ● | ○ | ● |
| | FD2 | | | | ● | ● | | ○ | ● | ○ | ● | | ○ | ● |
| | FD3 | | ● | | | ● | | | | ● | ○ | ● | ○ | ● |
| | FD4 | | | ● | | ● | | ○ | ● | ○ | ○ | ● | ○ | ● |
| | FD5 | | ● | ● | | | | | | ● | ○ | ● | ○ | ● |
| | FD6 | | | ● | ● | | | ○ | ● | ○ | ● | | ○ | ● |
| | FD7 | | ● | ● | | | | ● | | | ○ | ● | ○ | ● |
| | FD8 | | | ● | | | ● | ○ | ● | ○ | ○ | ● | ○ | ● |
| | FD9 | | | ● | ● | | | | ● | | ○ | ● | ● | |

○ : Preliminary engagement available

POWER TRANSMISSION APPARATUS FOR A VEHICLE

CROSS-REFERENCE TO RELATED APPLICATION

This application claims priority to and the benefit of Korean Patent Application No. 10-2018-0091540, filed on Aug. 7, 2018, which is incorporated herein by reference in its entirety.

FIELD

The present disclosure relates to a power transmission apparatus for a vehicle.

BACKGROUND

The statements in this section merely provide background information related to the present disclosure and may not constitute prior art.

An environment-friendly technology of a vehicle is a core technology for controlling an automotive industry in future, and car manufacturers have focused on the development of the environment-friendly vehicle for satisfying environmental and fuel efficiency regulations.

An electric vehicle (EV), a hybrid electric vehicle (HEV) that utilizes electrical energy, or a double clutch transmission (DCT) improving efficiency and convenience of a transmission may be examples of the vehicle technology in future.

Generally, the double clutch transmission (DCT) includes two clutch devices and a gear train of a basic manual transmission, selectively transmits a torque input from an engine to two input shafts by using the two clutch devices, and outputs a torque shifted by the gear train.

The DCT achieves an automated manual transmission (AMT) that removes the inconvenience of a manual shifting of a driver, by controlling two clutches and synchronizing devices by a controller.

In comparison with an automatic transmission using planetary gears, the DCT has benefits, such as higher efficiency in power delivery, easier modification in revising or adding parts in order to achieve more shift-stages, etc., and thus it can more comfortably comply with fuel consumption regulation and efficiency in achieving more shift-stages.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for a vehicle having capable of enabling multiple shift-stages by a simplified arrangement, improving installability, and reducing an overall weight.

An exemplary form of the present disclosure provides a power transmission apparatus for a vehicle includes an engine with an engine output shaft and a motor/generator with a motor shaft. The power transmission apparatus may include first, second, and third input shafts, a power mediating shaft, first and second intermediate shafts, an idle shaft, first and second shifting sections, and an output shaft. The first input shaft may be selectively connected with the motor shaft. The second input shaft may be hollow, which is disposed coaxially with and exterior to the first input shaft without rotational interference, and selectively connected with the motor shaft. The third input shaft may be hollow, which is disposed coaxially with and exterior to the second input shaft without rotational interference, and selectively connected with the motor shaft. The power mediating shaft may be hollow, which is disposed coaxially with and exterior to the first input shaft without rotational interference. The first intermediate shaft may be disposed in parallel with the first input shaft. The second intermediate shaft may be disposed in parallel with the first input shaft, and selectively connected with a transmission housing. The idle shaft may be disposed in parallel with the first input shaft. The first shifting section may include six gear sets disposed on the first and third input shafts, the first and second intermediate shafts, the idle shaft, and the power mediating shaft. The first shifting section may selectively receive a first torque through the first and third input shafts and output a plurality of intermediate shift-stages shifted from the first torque. The second shifting section may include a planetary gear set having a sun gear fixedly connected with the power mediating shaft, form a third torque by combination of the first torque selectively transmitted from the first shifting section and a second torque received from the second input shaft, and output the third torque to the output shaft. The output shaft may be disposed on a same axis with the second intermediate shaft, selectively connected with the second intermediate shaft, and output the third torque received from the first and second shifting sections.

The first shifting section may include first, second, third, fourth, fifth, and sixth gear sets. The first gear set may include a first drive gear and a first driven gear, the first drive gear being fixedly connected with the third input shaft, the first driven gear being fixedly connected with the first intermediate shaft and externally gear-meshed with the first drive gear. The second gear set may include a second drive gear, an intermediate gear, and a second driven gear, the second drive gear being disposed coaxial with and exterior to the first intermediate shaft without rotational interference, the intermediate gear being fixedly connected with the power mediating shaft and externally gear-meshed with the second drive gear, the second driven gear being fixedly connected with the second intermediate shaft and externally gear-meshed with the intermediate gear. The third gear set may include a third drive gear and a third driven gear, the third drive gear being fixedly connected with the first input shaft, the third driven gear being disposed coaxially with and exterior to the second intermediate shaft without rotational interference and externally gear-meshed with the third drive gear. The fourth gear set may include a fourth drive gear and a fourth driven gear, the fourth drive gear being fixedly connected with the first input shaft, the fourth driven gear being disposed coaxially with and exterior to the second intermediate shaft without rotational interference and externally gear-meshed with the fourth drive gear. The fifth gear set may include the first drive gear and a fifth driven gear, the first drive gear being fixedly connected with the third input shaft, the fifth driven gear being fixedly connected with the idle shaft and externally gear-meshed with the first drive gear. The sixth gear set may include a sixth drive gear and the intermediate gear, the sixth drive gear being disposed coaxially with and exterior to the idle shaft without rotational interference, the intermediate gear being fixedly connected with the power mediating shaft and externally gear-meshed with the sixth drive gear.

The third driven gear and the fourth driven gear may be selectively interconnected through a first synchronizer. The second drive gear may be selectively connected with first intermediate shaft through a second synchronizer. The sixth drive gear may be selectively connected with the idle shaft through a third synchronizer.

Gear ratios of the first gear set and the second gear set may be used for realizing a forward second speed and a forward sixth speed. A gear ratio of the third gear set may be used for realizing a forward first speed and a forward seventh speed. A gear ratio of the fourth gear set may be used for realizing a forward third speed and a forward fifth speed. Gear ratios of the fifth gear set and the sixth gear set may be used for realizing a forward ninth speed and a reverse speed.

The sun gear of the planetary gear set may be fixedly connected with the power mediating shaft. A planet carrier of the planetary gear set may be fixedly connected with the second input shaft. A ring gear of the planetary gear set may be externally gear-meshed with the output shaft through a seventh gear set.

The seventh gear set may include a seventh drive gear and a seventh driven gear. The seventh drive gear may be fixedly connected with the ring gear of the planetary gear set. The seventh driven gear may be fixedly connected with the output shaft and externally gear-meshed with the seventh drive gear.

The planetary gear set may be a single pinion planetary gear set.

According to one exemplary form of the present disclosure, the power transmission apparatus may further include four clutches each selectively connecting corresponding pair among the motor shaft, the engine output shaft, the first, second and third shafts, the power meditating shaft, the first and second intermediate shafts, the idle shaft and the output shaft, and a brake selectively connecting one of the shafts to the transmission housing.

The power transmission apparatus preferably includes an engine clutch disposed between the engine output and the motor shaft. The four clutches may include a first clutch disposed between the motor shaft and the first input shaft, a second clutch disposed between the motor shaft and the second input shaft, a third clutch disposed between the motor shaft and the third input shaft, and a fourth clutch disposed between the second intermediate shaft and the output shaft, The brake may be disposed between the second intermediate shaft and the transmission housing.

The first and second shifting sections may be arranged such that the engine is disposed closer to the second shifting section than to the first shifting section.

A power transmission apparatus for a vehicle according to an exemplary form of the present disclosure realizes shift-stages of nine forward speeds and one reverse speed by employing a planetary gear set and three synchronizers to a multiple clutch transmission, thereby enabling multiple shift-stages by a simplified arrangement, improving installability, and reducing an overall weight.

In addition, an exemplary form of the present disclosure may receive torque from a motor/generator as well as an engine, such that a vehicle may be driving in an electric vehicle mode and parallel hybrid mode, thereby improving fuel consumption.

Further areas of applicability will become apparent from the description provided herein. It should be understood that the description and specific examples are intended for purpose of illustration only and are not intended to limit the scope of the present disclosure.

DRAWINGS

In order that the disclosure may be well understood, there will be now be described various forms thereof, given by way of example, reference being made to the accompanying drawings, in which:

FIG. 1 is a schematic view of a power transmission apparatus for a vehicle according to an exemplary form of the present disclosure; and FIG. 2 is a shifting operational chart for the power transmission apparatus for the vehicle according to an exemplary form of the present disclosure.

The drawings described here are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second and the like is to divide the names because the names of the components are the same as each other and an order thereof is not particularly limited.

In the following description, various members are described as being connected, which may include members that are directly connected, fixedly connected, selectively connected or operably connected. In the drawings, various members are shown as being directly connected for movement together, and thus include members that are fixedly connected. Herein, the term "fixedly connected" or the like means at least two members that are connected to each other to always rotate together. When two or more members are described to be "selectively connected" by an engagement element, it means that the selectively connected member rotates separately when the engagement element is not engaged. Therefore, it is to be understood by a person of an ordinary skill in the art that the term "fixedly connected" or the like differs from the terms "operably connected", "selectively connected" or the like.

FIG. 1 is a schematic view of a power transmission apparatus for a vehicle according to an exemplary form of the present disclosure.

As shown in FIG. 1, a power transmission apparatus for a vehicle shifts torques of an engine ENG as a primary power source and a motor/generator MG as an auxiliary power source. The power transmission apparatus includes: first, second, and third input shafts IS1, IS2, and IS3, power mediating shaft TMS, first and second intermediate shafts CS1 and CS2, idle shaft IDS, first and second shifting sections TM1 and TM2, and an output shaft OS.

The engine ENG as a primary power source may be realized as a various kind of typical engines such as a gasoline engine or a diesel engine that uses fossil fuel.

The motor/generator MG may act as a motor and as a generator, and includes a stator ST, which is fixed to the transmission housing H, and a rotor RT rotatably supported within the stator ST.

Torques from the engine ENG and/or the motor/generator MG are supplied to the first shifting section TM1, and a plurality of intermediate shift-stages are formed at the first shifting section TM1 by the supplied torques. Receiving a torque from the first shifting section TM1 and selectively receiving a torque from the engine ENG through a separate route, the second shifting section TM2 performs shifting operation and outputs a shifted torque through the output shaft OS.

The first, second, and third input shafts IS1, IS2, and IS3 and the power mediating shaft TMS are disposed on a same axis. The first and second intermediate shafts CS1 and CS2, the idle shaft IDS, and the output shaft OS are disposed in parallel with the first input shaft IS1. The second intermediate shaft CS2 and the output shaft OS are disposed on a same axis and selectively interconnected with each other.

The motor/generator MG is disposed in a rear of the engine ENG.

A motor shaft MDS fixedly connected with the rotor RT of the motor/generator MG is selectively connected with an output shaft EOS of the engine ENG interposing an engine clutch ECL.

The first input shaft IS1 is selectively connected with the motor shaft MDS. The first input shaft IS1 delivers torques from the engine ENG and the motor/generator MG to the first shifting section TM1.

The second input shaft IS2 is formed as a hollow shaft and disposed coaxially with and exterior to the first input shaft IS1 without rotational interference, and selectively connected with the motor shaft MDS thereby selectively transmitting torques of the engine ENG and the motor/generator MG to the second shifting section TM2.

The third input shaft IS3 is formed as a hollow shaft and disposed coaxially with and exterior to the second input shaft IS2 without rotational interference, and selectively connected with the motor shaft MDS thereby selectively transmitting torques of the engine ENG and the motor/generator MG to the first shifting section TM1.

The power mediating shaft TMS is formed as a hollow shaft and disposed coaxially with and exterior to the first input shaft IS1 without rotational interference.

The second intermediate shaft CS2 is selectively connected with the transmission housing H through a first brake B1, and may be rotationally fixed by the operation of the first brake B1.

The first shifting section TM1 includes first, second, third, fourth, fifth, and sixth gear sets GL1, GL2, GL3, GL4, GL5, and GL6 disposed on the first and third input shafts IS1 and IS3, the first and second intermediate shafts CS1 and CS2, the power mediating shaft TMS, and the idle shaft IDS.

The second shifting section TM2 includes a planetary gear set PG. The planetary gear set PG is a single pinion planetary gear set, and includes a first sun gear S, a planet carrier PC rotatably supporting a plurality of pinion gears P externally gear-meshed with the sun gear S, and a ring gear R internally gear-meshed with the plurality of pinion gears P.

The planetary gear set PG is arranged between the second input shaft IS2 and the power mediating shaft TMS. The sun gear S is fixedly connected with the power mediating shaft TMS. The planet carrier PC is fixedly connected with the second input shaft IS2. The ring gear R is externally gear-meshed with the output shaft OS by a seventh gear set GL7.

The first gear set GL1 includes a first drive gear IDG1 and a first driven gear IPG1. The first drive gear IDG1 fixedly connected with the third input shaft IS3. The first driven gear IPG1 is fixedly connected with the first intermediate shaft CS1, and externally gear-meshed with the first drive gear IDG1.

The second gear set GL2 includes a second drive gear IDG2, an intermediate gear ICDG, and a second driven gear IPG2. The second drive gear IDG2 is disposed coaxially with and exterior to first intermediate shaft CS1 without rotational interference. The intermediate gear ICDG is fixedly connected with the power mediating shaft TMS and externally gear-meshed with the second drive gear IDG2. The second driven gear IPG2 is fixedly connected with the second intermediate shaft CS2, and externally gear-meshed with the intermediate gear ICDG.

The third gear set GL3 includes a third drive gear IDG3 and a third driven gear IPG3. The third drive gear IDG3 is fixedly connected with the first input shaft IS1. The third driven gear IPG3 is disposed coaxial with and exterior to the second intermediate shaft CS2 without rotational interference, and externally gear-meshed with the third drive gear IDG3.

The fourth gear set GL4 includes a fourth drive gear IDG4 and a fourth driven gear IPG4. The fourth drive gear IDG4 is fixedly connected with the first input shaft IS1. The fourth driven gear IPG4 is disposed coaxially with and exterior to the second intermediate shaft CS2 without rotational interference, and externally gear-meshed with the fourth drive gear IDG4.

The fifth gear set GL5 includes the first drive gear IDG1 and a fifth driven gear IPG5. The first drive gear IDG1 is fixedly connected with the third input shaft IS3. The fifth driven gear IPG5 is fixedly connected with the idle shaft IDS, and externally gear-meshed with the first drive gear IDG1.

The sixth gear set GL6 includes a sixth drive gear IDG6 and the intermediate gear ICDG. The sixth drive gear IDG6 is disposed coaxially with and exterior to the idle shaft IDS without rotational interference. The intermediate gear ICDG is fixedly connected with the power mediating shaft TMS and externally gear-meshed with the sixth drive gear IDG6.

The seventh gear set GL7 includes a seventh drive gear IDG7 and a seventh driven gear IPG7. The seventh drive gear IDG7 is fixedly connected with the ring gear of the planetary gear set PG. The seventh driven gear IPG7 is fixedly connected with the output shaft OS, and externally gear-meshed with the seventh drive gear IDG7.

The third driven gear IPG3 and the fourth driven gear IPG4 are selectively connected with the second intermediate shaft CS2 by a first synchronizer SN1.

The second drive gear IDG2 is selectively connected with the first intermediate shaft CS1 by a second synchronizer SN2.

The sixth drive gear IDG6 is selectively connected with the idle shaft IDS by a third synchronizer SN3.

Gear ratios between drive and driven gears of the first, second, third, fourth, fifth, and sixth gear sets GL1, GL2, GL3, GL4, GL5, and GL6 may be appropriately set in consideration of transmission requirements. The gear ratios of the first gear set GL1 and the second gear set GL2 are used for realizing the forward second speed FD2 and the forward sixth speed FD6. The gear ratio of the third gear set GL3 is used for realizing the forward first speed FD1 and the forward seventh speed FD7. The gear ratio of the fourth gear set GL4 is used for realizing the forward third speed FD3 and the forward fifth speed FD5. The gear ratios of the fifth gear set GL5 and the sixth gear set GL6 are used for realizing the forward ninth speed FD9 and the reverse speed.

The output shaft OS is an output member, and by receiving torques input from the second intermediate shaft CS2 and from the seventh gear set GL7, transmits the received torque to a differential DIFF through the output gear OG and the final reduction gear FDG.

In addition, four engagement elements of first, second, third, and fourth clutches CL1, CL2, CL3, and CL4 are disposed between rotating members such as various shafts, and one engagement of a brake B1 is disposed a rotating member and the transmission housing H.

The engine clutch ECL is disposed between the engine output shaft EOS (e.g., an engine crankshaft) and the motor shaft MDS, and selectively interconnects the engine output shaft EOS and the motor shaft MDS.

The first clutch CL1 is disposed between the motor shaft MDS and the first input shaft IS1, so as to selectively interconnect the motor shaft MDS and the first input shaft IS1.

The second clutch CL2 is disposed between the motor shaft MDS and the second input shaft IS2, so as to selectively interconnect the motor shaft MDS and the second input shaft IS2.

The third clutch CL3 is disposed between the motor shaft MDS and the third input shaft IS3, so as to selectively interconnect the motor shaft MDS and the third input shaft IS3.

The fourth clutch CL4 is disposed between the second intermediate shaft CS and the output shaft OS, so as to selectively interconnect the second intermediate shaft CS2 and the output shaft OS.

The first brake B1 is disposed between the second intermediate shaft CS2 and the transmission housing H, so as to selectively activate the second intermediate shaft CS2 as a fixed element.

The engagement elements of the engine clutch ECL, the first to fourth clutches CL1 to CL4, and the first brake B1 may be realized as multi-plate hydraulic pressure friction devices that are frictionally engaged by hydraulic pressure, however, it should not be understood to be limited thereto, since various other configurations that are electrically controllable may be available.

The first, second, and third synchronizers SN1, SN2, and SN3 may be formed as a known scheme, and first, second, and third sleeves SLE1, SLE2, and SLE3 applied to the first, second, and third synchronizers SN1, SN2, and SN3 may be operated by respective actuators (not shown) that may be controlled by a transmission control unit.

As shown in FIG. 1, the second shifting section TM2 is disposed at a rear of the engine ENG, and the first shifting section TM1 is disposed at a rear of the second shifting section TM2.

FIG. 2 is a shifting operational chart for a power transmission apparatus for a vehicle according to an exemplary form of the present disclosure, and the power transmission apparatus for a vehicle according to a first exemplary form of the present disclosure performs shifting operation as follows.

[Engine and Parallel Mode Reverse Speed]

Hereinafter, the term "engine and parallel mode" indicates a mode that the engine ENG is running. The motor/generator MG may be activated or not. Thus, the term includes a pure engine mode in which only the engine ENG acts as a power source, and also includes a parallel mode in which both the engine ENG and the motor/generator MG act as power sources.

In the engine and parallel mode reverse speed REV, as shown in FIG. 2, the idle shaft IDS and the sixth drive gear IDG6 are interconnected by the sleeve SLE3 of the third synchronizer SN3, and the engine clutch ECL and the third and fourth clutches CL3 and CL4 are operated.

As a result, by the operation of the engine clutch ECL, the third clutch CL3, and the third synchronizer SN3, the torque of the engine ENG is transmitted to the second intermediate shaft CS2 through the motor shaft MDS, the third input shaft IS3, the fifth gear set GL5, the idle shaft IDS, the third synchronizer SN3, and the sixth gear set GL6.

Then, by the operation of the fourth clutch CL4, the torque of the second intermediate shaft CS2 is transmitted to the differential DIFF through the output shaft OS, thereby realizing the reverse speed REV.

[Engine and Parallel Mode Forward First Speed]

In the engine and parallel mode forward first speed FD1, as shown in FIG. 2, the second intermediate shaft CS2 and the third driven gear IPG3 are interconnected by the sleeve SLE1 of the first synchronizer SN1, and the engine clutch ECL and the first and fourth clutches CL1 and CL4 are operated.

As a result, by the operation of the engine clutch ECL, the first clutch CL1, and the first synchronizer SN1, the torque of the engine ENG is transmitted to the second intermediate shaft OS2 through the motor shaft MDS, the first input shaft IS1, the third gear set GL3, and the first synchronizer SN1.

Then, by the operation of the fourth clutch CL4, the torque of the second intermediate shaft CS2 is transmitted to the differential DIFF through the output shaft OS, thereby realizing the forward first speed.

[Engine and Parallel Mode Forward Second Speed]

In the engine and parallel mode forward second speed FD2, as shown in FIG. 2, the first intermediate shaft CS2 and the second drive gear IDG2 are interconnected by the sleeve SLE2 of the second synchronizer SN2, and the engine clutch ECL and the third and fourth clutches CL3 and CL4 are operated.

As a result, by the operation of the engine clutch ECL, the third clutch CL3, and the second synchronizer SN2, the torque of the engine ENG is transmitted to the second intermediate shaft CS2 through the motor shaft MDS, the third input shaft IS3, the first gear set GL1, the first intermediate shaft CS1, the second synchronizer SN2, and the second gear set GL2.

Then, by the operation of the fourth clutch CL4, the torque of the second intermediate shaft CS2 is transmitted to the differential DIFF through the output shaft OS, thereby realizing the forward second speed.

[Engine and Parallel Mode Forward Third Speed]

In the engine and parallel mode forward third speed FD3, as shown in FIG. 2, the second intermediate shaft CS2 and the fourth driven gear IPG4 are interconnected by the sleeve SLE1 of the first synchronizer SN1, and the engine clutch ECL and the first and fourth clutches CL1 and CL4 are operated.

As a result, by the operation of the engine clutch ECL, the first clutch CL1, and the first synchronizer SN1, the torque of the engine ENG is transmitted to the second intermediate shaft OS2 through the motor shaft MDS, the first input shaft IS1, the fourth gear set GL4, and the first synchronizer SN1.

Then, by the operation of the fourth clutch CL4, the torque of the second intermediate shaft CS2 is transmitted to the differential DIFF through the output shaft OS, thereby realizing the forward third speed.

[Engine and Parallel Mode Forward Fourth Speed]

In the engine and parallel mode forward fourth speed FD4, as shown in FIG. 2, first, second, and third synchronizers SN1, SN2, and SN3 are maintained at neutral state, and the engine clutch ECL and the second and fourth clutches CL2 and CL4 are operated.

As a result, by the operation of the engine clutch ECL and the second clutch CL2, the torque of the engine ENG is transmitted to the planet carrier PC of the planetary gear set PG through the motor shaft MDS and the second input shaft IS2.

By the operation of the fourth clutch CL4, the seventh gear set GL7, the output shaft OS, the second intermediate shaft CS2, the second gear set GL2, and the power mediating shaft TMS are interconnected, and thereby the ring gear R connected to the seventh gear set GL7 is connected with the sun gear S connected to the power mediating shaft TMS. The speed relation between the ring gear R and the sun gear S is formed by the gear ratios of the second and seventh gear sets GL2 and GL7, while the planet carrier PC of the planetary gear set PG receives an input torque through the second input shaft IS2. Therefore, the sun gear S and the ring gear R of the planetary gear set PG rotates at respective speeds satisfying the speed relation while the planet carrier PC rotates at the speed of the motor shaft MDS.

By such a cooperative operation of rotation members of the planetary gear PG, the speed and torque of the output shaft OS connected to the seventh gear set GL7 is determined and transmitted to the differential DIFF through the output shaft OS, thereby realizing the forward fourth speed.

[Engine and Parallel Mode Forward Fifth Speed]

In the engine and parallel mode forward fifth speed FD5, as shown in FIG. 2, the second intermediate shaft CS and the fourth driven gear IPG4 are interconnected by the sleeve SLE1 of the first synchronizer SN1, and the engine clutch ECL and the first and second clutch CL1 and CL2 are operated.

As a result, by the operation of the engine clutch ECL, the first clutch CL1, and the first synchronizer SN1, the torque of the engine ENG is partially input to the sun gear S of planetary gear set PG through the motor shaft MDS, the first input shaft IS1, the fourth gear set GL4, the first synchronizer SN1, the second intermediate shaft CS2, the second gear set GL2, and the power mediating shaft TMS.

In addition, by the operation of the second clutch CL2, the torque of the engine ENG is partially input to the planet carrier PC of the planetary gear set PG through the motor shaft MDS and the second input shaft IS2.

Then, the planetary gear set PG realizes shifting based on speed difference between the sun gear S and the planet carrier PC, and outputs the shifted torque to the differential DIFF through the output shaft OS, thereby realizing the forward fifth speed.

[Engine and Parallel Mode Forward Sixth Speed]

In the engine and parallel mode forward sixth speed FD6, as shown in FIG. 2, the first intermediate shaft CS1 and the second drive gear IDG2 are interconnected by the sleeve SLE2 of the second synchronizer SN2, and the engine clutch ECL and the second and third clutches CL2 and CL3 are operated.

As a result, by the operation of the engine clutch ECL and second clutch CL2, the torque of the engine ENG is partially input to the planet carrier PC of the planetary gear set PG through the motor shaft MDS and the second input shaft IS2.

In addition, by the operation of the third clutch CL3 and the second synchronizer SN2, the torque of the engine ENG is partially input to the sun gear S of planetary gear set PG through the motor shaft MDS, the third input shaft IS3, the first gear set GL1, the first intermediate shaft CS1, the second synchronizer SN2, the second gear set GL2, and the power mediating shaft TMS.

Then, the planetary gear set PG realizes shifting based on speed difference between the sun gear S and the planet carrier PC, and outputs the shifted torque to the differential DIFF through the output shaft OS, thereby realizing the forward sixth speed.

[Engine and Parallel Mode Forward Seventh Speed]

In the engine and parallel mode forward seventh speed FD7, as shown in FIG. 2, the second intermediate shaft CS2 and the third driven gear IPG3 are interconnected by the sleeve SLE1 of the first synchronizer SN1, and the engine clutch ECL and the first and second clutch CL1 and CL2 are operated.

As a result, by the operation of the engine clutch ECL, the first clutch CL1, and the first synchronizer SN1, the torque of the engine ENG is partially input to the sun gear S of planetary gear set PG through the motor shaft MDS, the first input shaft IS1, the third gear set GL3, the first synchronizer SN1, the second intermediate shaft OS2, the second gear set GL2, and the power mediating shaft TMS.

In addition, by the operation of the second clutch CL2, the torque of the engine ENG is partially input to the planet carrier PC of the planetary gear set PG through the motor shaft MDS and the second input shaft IS2.

Then, the planetary gear set PG realizes shifting based on speed difference between the sun gear S and the planet carrier PC, and outputs the shifted torque to the differential DIFF through the output shaft OS, thereby realizing the forward seventh speed.

[Engine and Parallel Mode Forward Eighth Speed]

In the engine and parallel mode forward eighth speed FD8, as shown in FIG. 2, the first, second, and third synchronizers SN1, SN2, and SN3 are maintained at neutral state, and the engine clutch ECL, the second clutch CL2, and the first brake B1 are operated.

As a result, by the operation of the engine clutch ECL and the second clutch CL2, the torque of the engine ENG is transmitted to the planet carrier PC of the planetary gear set PG through the motor shaft MDS and the second input shaft IS2, and the sun gear S of the planetary gear set PG acts as a fixed element by the operation of the first brake B1.

Then, since the planet carrier PC of the planetary gear set PG receives input torque while the sun gear S acts as a fixed element, the planetary gear set PG outputs an increased speed through the ring gear R, and the torque output through the ring gear R is transmitted to the differential DIFF through the seventh gear set GL7 and the output shaft OS, thereby realizing the forward eighth speed In such a forward eighth speed, the planetary gear set PG outputs a further increased speed than in the forward seventh speed.

[Engine and Parallel Mode Forward Ninth Speed]

In the engine and parallel mode forward ninth speed FD9, as shown in FIG. 2, the idle shaft IDS and the sixth drive gear IDG6 are interconnected by the sleeve SLE3 of the third synchronizer SN3, and the engine clutch ECL and the second and third clutches CL2 and CL3 are operated.

As a result, by the operation of the engine clutch ECL and second clutch CL2, the torque of the engine ENG is partially input to the planet carrier PC of the planetary gear set PG through the motor shaft MDS and the second input shaft IS2.

In addition, by the operation of the third clutch CL3, the torque of the engine ENG is partially input to the sun gear S of the planetary gear set PG through the motor shaft MDS, the third input shaft IS3, the fifth gear set GL5, the idle shaft IDS, the third synchronizer SN3, and the sixth gear set GL6.

Then the planetary gear set PG outputs a further increased speed through the ring gear R than in the forward eighth speed, and the torque output through the ring gear R is transmitted to the differential DIFF through the seventh gear set GL7 and the output shaft OS, thereby realizing the forward ninth speed.

In the above description of the "engine and parallel mode", only the engine ENG is exampled as a power source.

However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shift-stages of one reverse speed REV and nine forward speeds of the forward first speed FD1 to the forward ninth speed FD9 may be obtained by the same operational chart.

A power transmission apparatus for a vehicle according to an exemplary form of the present disclosure realizes shift-stages of nine forward speeds and one reverse speed by employing a planetary gear set and three synchronizers to a multiple clutch transmission, thereby enabling multiple shift-stages by a simplified arrangement, improving installability, and reducing an overall weight.

In addition, an exemplary form of the present disclosure may receive torque from a motor/generator as well as an engine, such that a vehicle may be driving in an electric vehicle mode and parallel hybrid mode, thereby improving fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1: first brake
CL1, CL2, CL3, CL4: first, second, third, and fourth clutch
CS1, CS2: first and second intermediate shafts
ECL: engine clutch
EOS: engine output shaft (crankshaft)
GL1, GL2, GL3, GL4, GL5, GL6, GL7: first, second, third, fourth, fifth, sixth, and seventh gear sets
IDG1, IDG2, IDG3, IDG4, IDG6, IDP7: first, second, third, fourth, sixth, and seventh drive gears
IPG1, IPG2, IPG3, IPG4, IPG5, IPG7: first, second, third, fourth, fifth, and seventh driven gears
IDS: idle shaft
IS1, IS2, IS3: first, second, and third input shafts
MDS: motor shaft
OG: output gear
OS: output shaft
PG: planetary gear set
SN1, SN2, SN3: first, second, and third synchronizers
TMS: power mediating shaft
TM1, TM2: first and second shifting sections

What is claimed is:

1. A power transmission apparatus for a vehicle having an engine with an engine output shaft and a motor/generator with a motor shaft, the power transmission apparatus comprising:
    a first input shaft selectively connected with the motor shaft;
    a second input shaft, the second input shaft being hollow and disposed coaxially with and exterior to the first input shaft without rotational interference, and selectively connected with the motor shaft;
    a third input shaft, the third input shaft being hollow and disposed coaxially with and exterior to the second input shaft without rotational interference, and selectively connected with the motor shaft;
    a power mediating shaft, the power meditating shaft being hollow and disposed coaxially with and exterior to the first input shaft without rotational interference;
    a first intermediate shaft disposed in parallel with the first input shaft;
    a second intermediate shaft disposed in parallel with the first input shaft, and selectively connected with a transmission housing;
    an idle shaft disposed in parallel with the first input shaft;
    a first shifting section including six gear sets disposed on the first and third input shafts, the first and second intermediate shafts, the idle shaft, and the power mediating shaft, the first shifting section selectively receiving a first torque through the first and third input shafts and outputting a plurality of intermediate shift-stages shifted from the first torque;
    a second shifting section including a planetary gear set having a sun gear fixedly connected with the power mediating shaft, forming a third torque by combination of the first torque selectively transmitted from the first shifting section and a second torque received from the second input shaft, and outputting the third torque to an output shaft; and
    the output shaft disposed on a same axis with the second intermediate shaft, selectively connected with the second intermediate shaft, and outputting the third torque received from the first and second shifting sections.

2. The power transmission apparatus of claim 1, wherein the first shifting section comprises:
    a first gear set having a first drive gear and a first driven gear, the first drive gear being fixedly connected with the third input shaft, the first driven gear being fixedly connected with the first intermediate shaft and externally gear-meshed with the first drive gear;
    a second gear set having a second drive gear, an intermediate gear, and a second driven gear, the second drive gear being disposed coaxial with and exterior to the first intermediate shaft without rotational interference, the intermediate gear being fixedly connected with the power mediating shaft and externally gear-meshed with the second drive gear, the second driven gear being fixedly connected with the second intermediate shaft and externally gear-meshed with the intermediate gear;
    a third gear set having a third drive gear and a third driven gear, the third drive gear being fixedly connected with the first input shaft, the third driven gear being disposed coaxially with and exterior to the second intermediate shaft without rotational interference and externally gear-meshed with the third drive gear;
    a fourth gear set having a fourth drive gear and a fourth driven gear, the fourth drive gear being fixedly connected with the first input shaft, the fourth driven gear being disposed coaxially with and exterior to the second intermediate shaft without rotational interference and externally gear-meshed with the fourth drive gear;
    a fifth gear set having the first drive gear and a fifth driven gear, the first drive gear being fixedly connected with the third input shaft, the fifth driven gear being fixedly connected with the idle shaft and externally gear-meshed with the first drive gear; and a sixth gear set having a sixth drive gear and the intermediate gear, the sixth drive gear being disposed coaxially with and exterior to the idle shaft without rotational interference, the intermediate gear being fixedly connected with the power mediating shaft and externally gear-meshed with the sixth drive gear.

3. The power transmission apparatus of claim 2, wherein:

the third driven gear and the fourth driven gear are selectively interconnected through a first synchronizer;

the second drive gear is selectively connected with first intermediate shaft through a second synchronizer; and the sixth drive gear is selectively connected with the idle shaft through a third synchronizer.

4. The power transmission apparatus of claim 2, wherein:

gear ratios of the first gear set and the second gear set are used for realizing a forward second speed and a forward sixth speed;

a gear ratio of the third gear set is used for realizing a forward first speed and a forward seventh speed;

a gear ratio of the fourth gear set is used for realizing a forward third speed and a forward fifth speed; and gear ratios of the fifth gear set and the sixth gear set are used for realizing a forward ninth speed and a reverse speed.

5. The power transmission apparatus of claim 1, wherein:

the sun gear of the planetary gear set is fixedly connected with the power mediating shaft;

a planet carrier of the planetary gear set is fixedly connected with the second input shaft; and a ring gear of the planetary gear set is externally gear-meshed with the output shaft through a seventh gear set.

6. The power transmission apparatus of claim 5, wherein the seventh gear set comprises:

a seventh drive gear fixedly connected with the ring gear of the planetary gear set; and a seventh driven gear fixedly connected with the output shaft and externally gear-meshed with the seventh drive gear.

7. The power transmission apparatus of claim 5, wherein the planetary gear set is a single pinion planetary gear set.

8. The power transmission apparatus of claim 1, further comprising:

four clutches each selectively connecting corresponding pair among the motor shaft, the engine output shaft, the first, second and third shafts, the power mediating shaft, the first and second intermediate shafts, the idle shaft and the output shaft; and a brake selectively connecting one of the shafts to the transmission housing.

9. The power transmission apparatus of claim 8, further comprising an engine clutch disposed between the engine output shaft and the motor shaft, and wherein the four clutches comprise:

a first clutch disposed between the motor shaft and the first input shaft;

a second clutch disposed between the motor shaft and the second input shaft;

a third clutch disposed between the motor shaft and the third input shaft; and a fourth clutch disposed between the second intermediate shaft and the output shaft, wherein the brake is disposed between the second intermediate shaft and the transmission housing.

10. The power transmission apparatus of claim 1, wherein the first and second shifting sections are arranged such that the engine is disposed closer to the second shifting section than to the first shifting section.

* * * * *